Aug. 25, 1925.
C. M. C. BAIRD
HOSE COUPLING
Filed April 23, 1923
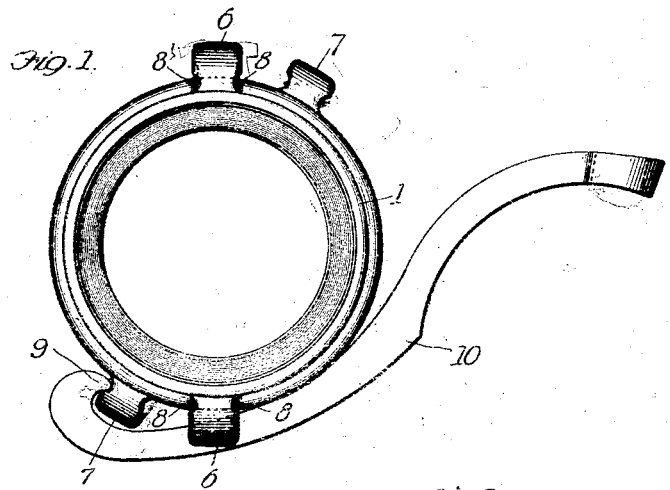
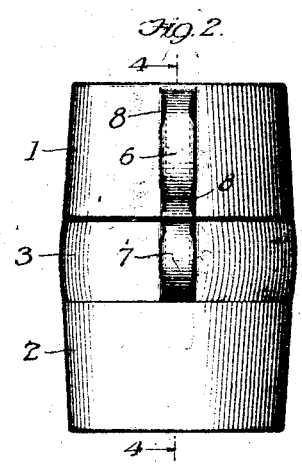
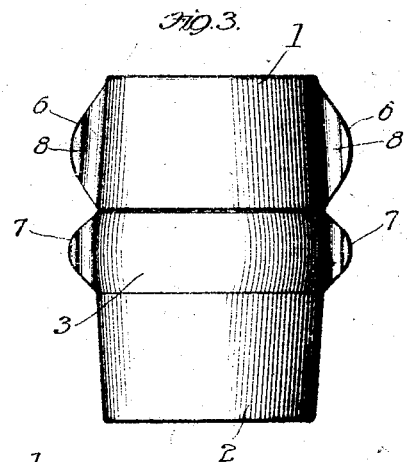
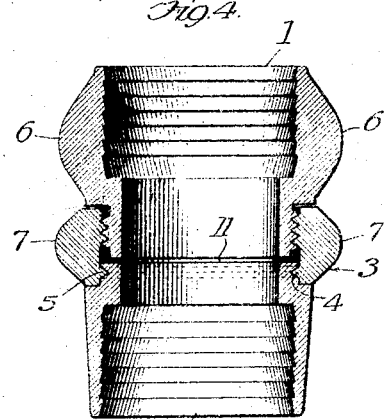
Witness
Martin H. Olsen.
Inventor
Cassius M. C. Baird
By Rummler & Rummler
Attys Patented Aug. 25, 1925.

1,550,773

UNITED STATES PATENT OFFICE.

CASSIUS M. CLAY BAIRD, OF CHICAGO, ILLINOIS.

HOSE COUPLING.

Application filed April 23, 1923. Serial No. 633,872.

*To all whom it may concern:*

Be it known that I, CASSIUS M. CLAY BAIRD, a citizen of the United States of America, and a resident of Chicago, in the county of Cook and State of Illinois, have invented a new and useful Improvement in Hose Couplings, of which the following is a specification.

This invention relates to hose couplings of the type commonly employed in fire hose, and the object of the invention is to provide an improved form of lug for such a coupling.

The improved construction is illustrated by the accompanying drawings in which:—

Figure 1 is an end view of the coupling showing a spanner wrench applied thereto.

Figures 2 and 3 are plan or side views of the coupling.

Figure 4 is a sectional view taken on the line 4—4, Figure 2.

The purpose of this invention is to provide a well-known type of coupling with a lug which will easily ride over obstructions, and which will strengthen the coupling without necessarily adding to its weight. Couplings of this type are now generally provided with a cylindrical type of projecting lug, since other proposed forms unnecessarily add to the weight of the coupling. This is also the case when the body of the coupling is thick enough to allow for radially extending recesses for the reception of a lug on a spanner wrench.

The present construction is the result of experience with couplings having the common type of radially extending cylindrical lugs. These are found to wear or cut the hose casing when the hose is withdrawn from the hose transporting apparatus or when in such apparatus, as the hose is necessarily much shaken and vibrated during transportation. Also when one end of a hose is connected with a hydrant or pump, and the supporting apparatus is driven ahead in order to draw out the hose, the cylindrical lugs will often catch and pull several folds in a clump out of the vehicle and thus cause unnecessary wear on the hose as it is drawn over the ground. The cylindrical type of lug also causes annoyance to men handling the hose, not only when screwing the coupling together by hand, but because it has a tendency to catch on projecting corners. It is common to station a man at a stairway to keep the hose clear as it is drawn up.

The improved lug overcomes these difficulties in that it does not catch on street pavings, curbs, corners, stairways, windows, roofs, etc., does not injure stairways or windows, and permits the hose to run freely out of the transporting apparatus without cutting the hose jackets, and further results in a strong coupling. Considerable breakage results in the assembly of the hose coupling when one of the tail pieces thereof is expanded into the swivelled part of the coupling, or when the bushing at the end of the hose is expanded to secure the hose in the coupling. The present lugs extending longitudinally along one of the tail pieces and along the swivelled part of the coupling, permits these parts of the coupling to better withstand this internal pressure.

Referring to the drawings, the coupling is of usual construction with respect to the end members 1 and 2 to which are attached the ends of hose sections, also in respect to swivelled member 3 having the usual annular shoulder 4 for engaging an annular groove 5 and the member 2. In assembling the parts 2 and 3, the reduced end of the part 2 is inserted in the member 3 and then expanded to form a swivelled connection at the shoulder 4.

The improved lugs 6 and 7 on the members 1 and 3 extend substantially from end to end thereof in a lengthwise direction, and the outer surfaces of the lugs are convex in the direction of length and have rounded corners or sides, so as not to cut the hands when the connection is made by hand. The lugs are provided with longitudinally extending recesses 8 at their sides to provide suitable engagement for the claw 9 of a spanner wrench 10. The usual gasket between the adjacent ends of the parts 1 and 2 of the coupling is indicated at 11.

In operating the device the hose sections are connected or disconnected by rotating the swivelled collar 3 with respect to the part 1 of the coupling. This can easily be done by hand, since the present type of lug with rounded corners, even when it has become nicked, is less likely to have projecting burrs than the common type of lugs.

Also the hose may be quickly drawn over pavings and around corners and up stairways without likelihood of the lugs catching.

I claim:—

1. A hose coupling comprising end members and a collar swiveled to one of said end members, said collar and the remaining one of the end members having threaded engagement and each being provided with ears extending longitudinally substantially throughout the length of the exposed surfaces thereof, and being rounded longitudinally so as to taper gradually outwardly from the center of the ears, the said ears forming hand holds.

2. A hose coupling comprising end members and a collar swiveled to one of said end members, and the remaining one of said end members and said collar having ears extending longitudinally substantially throughout the length of the exposed surfaces thereof, and being rounded both longitudinally and transversely.

Signed at Chicago this 20th day of April 1923.

CASSIUS M. CLAY BAIRD.